United States Patent [19]

Bowman et al.

[11] Patent Number: 4,825,997

[45] Date of Patent: May 2, 1989

[54] PNEUMATICALLY ACTUATED TENSIONING ARRANGEMENT FOR CONVEYOR BELT CLEANER

[75] Inventors: Michael A. Bowman, Sheffield, Ill.; Larry J. Goldbeck, Camanche, Iowa; Richard P. Stahura, Aspen, Colo.; Mark N. Stern, Kewanee, Ill.

[73] Assignee: Martin Engineering Co., Neponset, Ill.

[21] Appl. No.: 107,263

[22] Filed: Oct. 9, 1987

[51] Int. Cl.⁴ .............................................. B65G 45/00
[52] U.S. Cl. ...................................................... 198/499
[58] Field of Search ....................... 198/497, 499, 498; 15/256.5, 256.51, 256.6

[56] References Cited

U.S. PATENT DOCUMENTS

| | | | |
|---|---|---|---|
| 2,794,540 | 6/1957 | Sinden | 198/499 X |
| 3,087,184 | 4/1963 | Ljungquist | 15/256.51 |
| 3,128,207 | 4/1964 | Schmitt | 15/256.51 |
| 3,342,312 | 9/1967 | Reiter | 198/499 |
| 3,994,384 | 11/1976 | Reiter | 198/497 |
| 3,994,385 | 11/1976 | Reiter | 198/499 |
| 4,036,354 | 7/1977 | Reiter | 198/499 |
| 4,098,394 | 7/1978 | Stahura | 198/499 |
| 4,105,109 | 8/1978 | Schultz | 198/499 |
| 4,189,046 | 2/1980 | Ward et al. | 198/499 |
| 4,202,437 | 5/1980 | Gordon | 198/497 |
| 4,249,650 | 2/1981 | Stahura | 198/499 |
| 4,269,301 | 5/1981 | Gibbs | 198/499 |
| 4,489,823 | 12/1984 | Gordon | 198/499 |
| 4,520,917 | 6/1985 | Sillivent et al. | 198/499 |
| 4,533,036 | 8/1985 | Gordon | 198/499 |
| 4,586,600 | 5/1986 | Lindbeck | 198/499 |
| 4,598,823 | 7/1986 | Swinderman | 198/499 X |
| 4,633,999 | 1/1987 | Perneczky | 198/499 |

FOREIGN PATENT DOCUMENTS

| | | |
|---|---|---|
| 0094021 | 11/1983 | European Pat. Off. . |
| 3624623 | 3/1987 | Fed. Rep. of Germany ...... 198/499 |
| 8800916 | 2/1988 | PCT Int'l Appl. ................. 198/499 |
| 2165200 | 4/1986 | United Kingdom . |

Primary Examiner—Frank E. Werner
Assistant Examiner—Cheryl L. Gastineau
Attorney, Agent, or Firm—Mann, McWilliams Zummer and Sweeney

[57] ABSTRACT

A tensioning arrangement is provided to position belt cleaner blades relative to conveyor belt, which arrangement includes an inflatable bladder which acts to move a pivotally mounted crank, which, in turn, moves a support shaft, which carries the cleaner blades. Pressurization of the bladder causes it to expand thereby engaging the arm which moves the support shaft to a position at which the cleaner blades engage the belt to be cleaned.

5 Claims, 4 Drawing Sheets

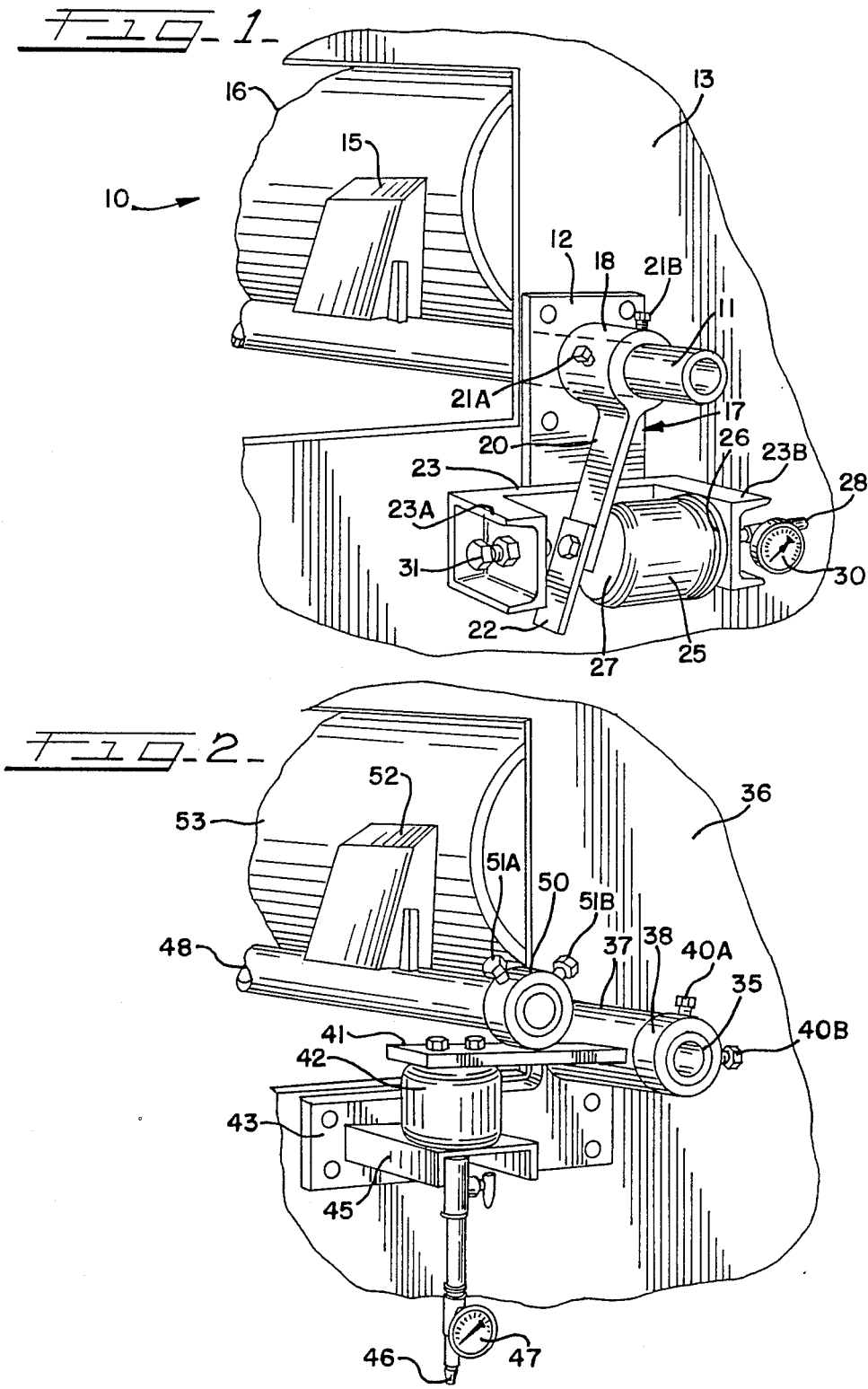

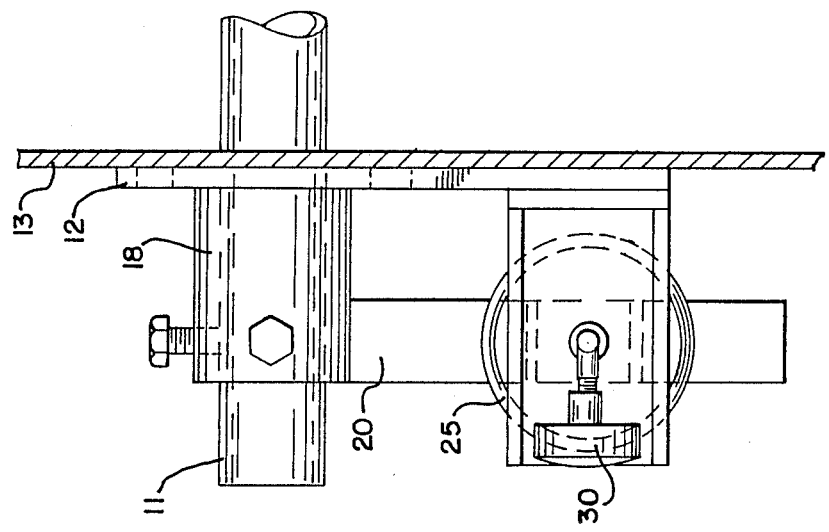
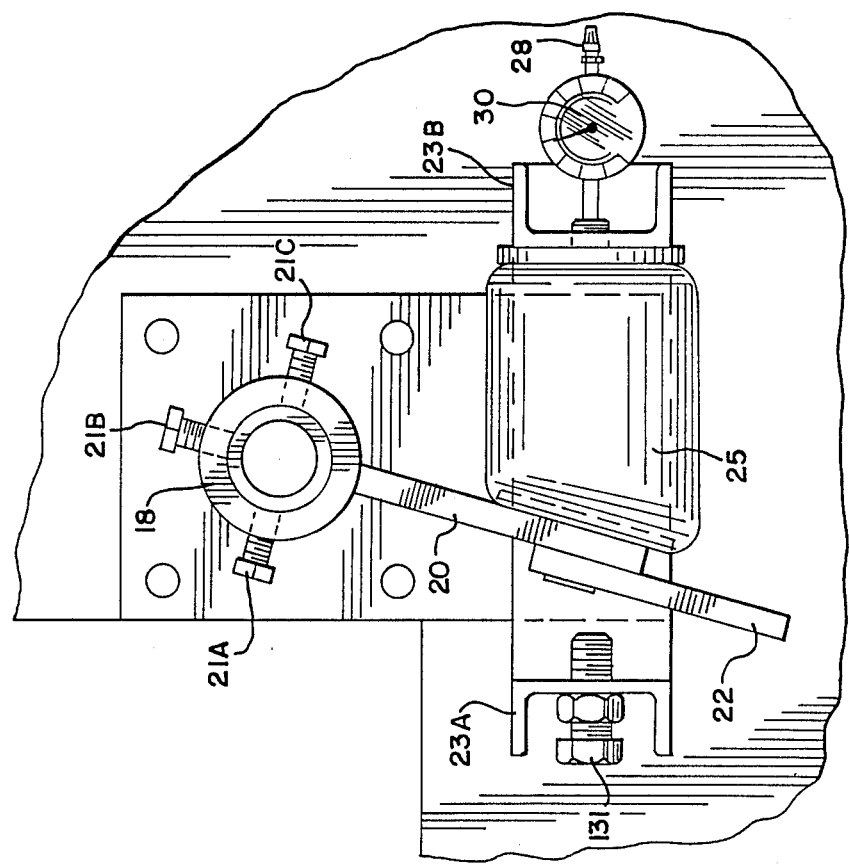

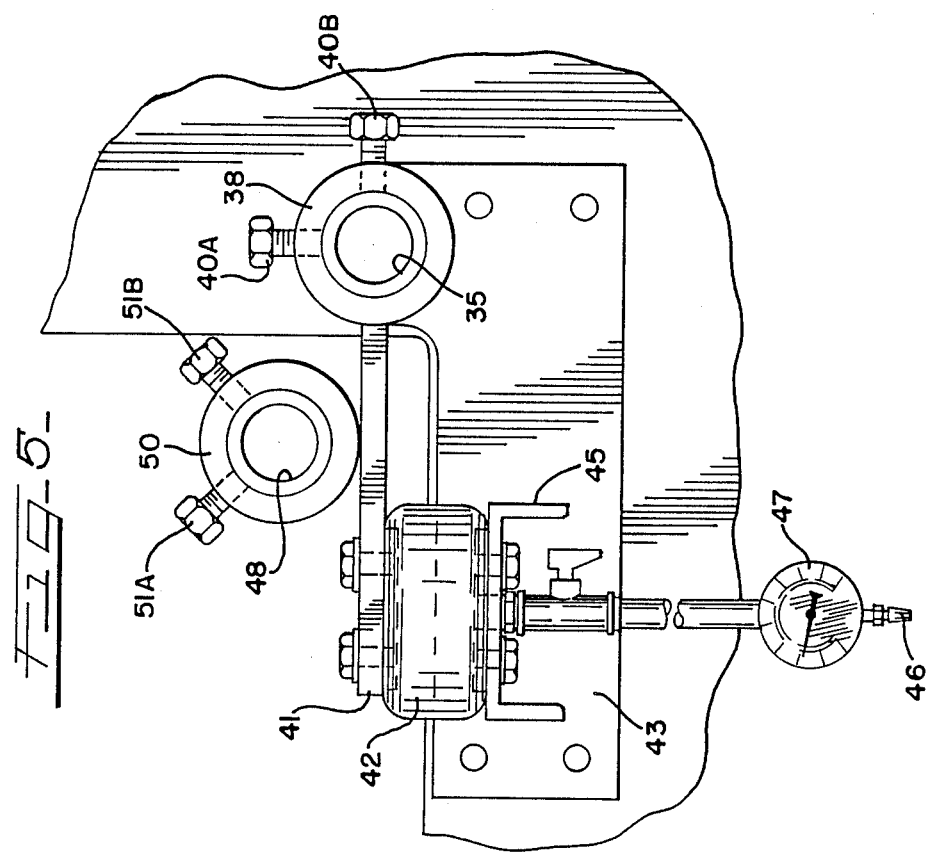
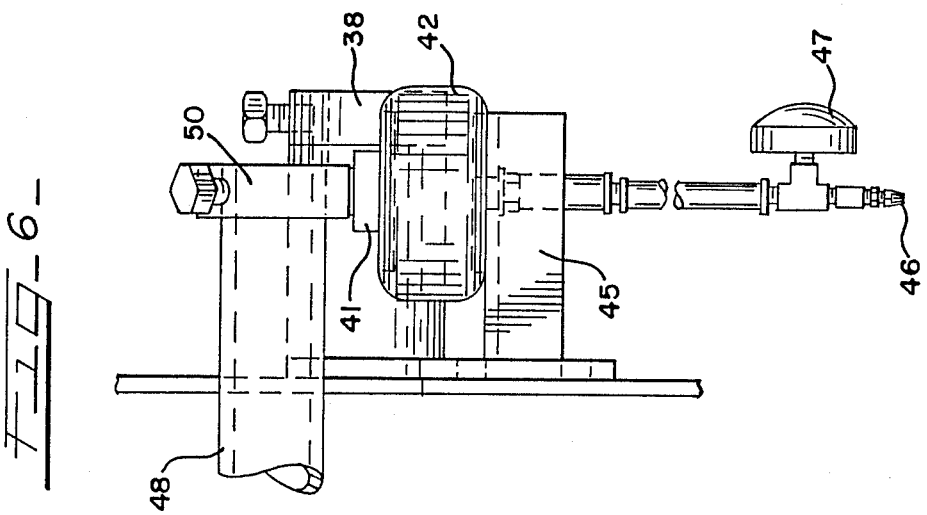

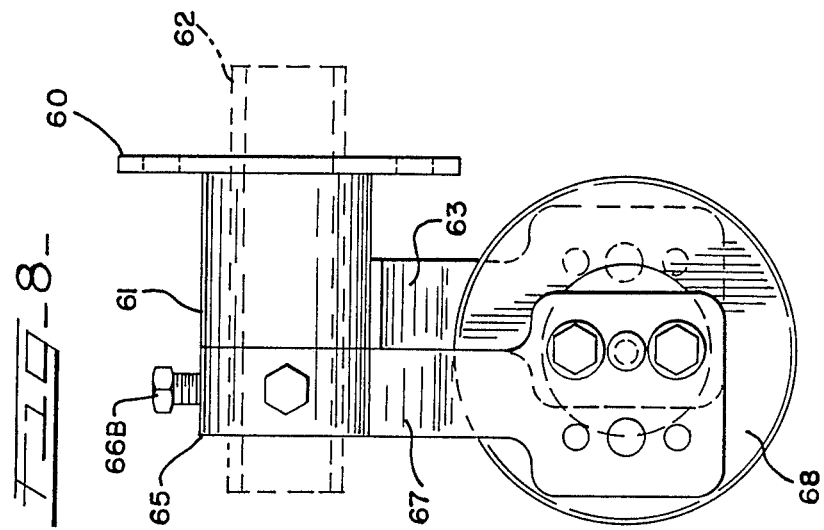
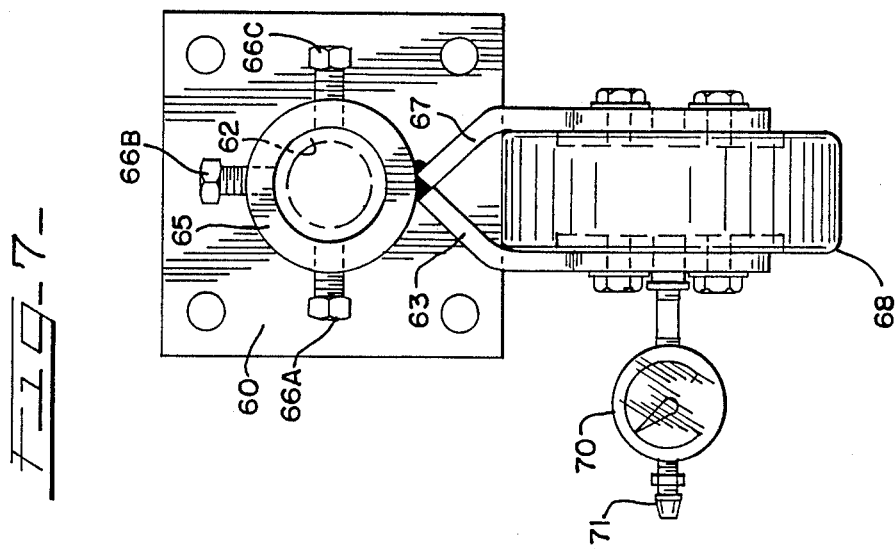

4,825,997

PNEUMATICALLY ACTUATED TENSIONING ARRANGEMENT FOR CONVEYOR BELT CLEANER

BACKGROUND OF THE INVENTION

It has been known in the prior art to provide a mounting arrangement for conveyor belt cleaners whereby the cross-shaft on which the cleaning blades are mounted can be rotated moving the cleaner blades either into or out of contact with the belt. This is accomplished by movement of a lever arm or ratchet connected to the cross-shaft and the subsequent locking of the arm and shaft against further rotation. Typical of prior art arrangements of this type is the ratchet tensioner disclosed in applicant's U.S. Pat. No. 4,098,394. This device achieves blade tensioning by means of a radial ratchet wrench and locks the blades against the belt through a pawl mechanism. This device is relatively expensive to manufacture, requires a ratchet wrench for operation, and only locks the blades against the belt for one direction of conveyor belt travel. If, for any reason, the direction of conveyor belt travel is reversed, the blades can be forced into the belt causing damage to the belt. Under sudden belt direction reversal, the ratchet handle may also spin with possible hazardous consequences to any persons in the immediate vicinity. Another tensioning arrangement of applicant's which utilizes a linkage connection to vary the force which the blades exert against the belt is described in U.S. Pat. No. 4,586,600.

One device which utilizes an inflatable bladder to bias an aligned series of scraper blades to move vertically upwardly into engagement with a moving conveyor belt is described in U.S. Pat. 4,105,109. Other devices are known in the prior art which utilize a dual-acting piston for tensioning of belt cleaners. Other prior art arrangements are found in U.S. Pat. Nos. 2,794,540, 3,342,312, 3,994,384, 3,994,385, and 4,036,354.

SUMMARY OF THE INVENTION

The present invention provides a tensioning arrangement for conveyor belt cleaners which is pneumatically actuated and eliminates the costs and dangers inherently associated with the mechanical arrangements known in the prior art. Use of a self-contained, expandable bladder to engage an arm connected to a transverse support shaft on which the cleaner blades are mounted to move cleaner blades into and out of engagement with the belt to be cleaned eliminates leakage and maintenance problems which are inherent with the dual-acting pistons used in prior art arrangements. A pressure gauge is connected to the bladder enabling an operator to inflate the bladder to a predetermined pressure which will result in a desired force urging the cleaner blades into engagement with the belt.

DESCRIPTION OF THE DRAWINGS

FIG. 1 is a perspective view of one embodiment of the belt cleaner and tensioning arrangement of the present invention showing the blades engaging the belt.

FIG. 2 is a perspective view of a modified embodiment of the tensioning arrangement.

FIG. 3 is a side view of certain elements of the tensioning arrangement shown in FIG. 1.

FIG. 4 is an end view of that portion of the tensioner shown in FIG. 3.

FIG. 5 is a side view of the modified embodiment of the tensioner shown in FIG. 2.

FIG. 6 is an end view of that portion of the tensioner shown in FIG. 5.

FIG. 7 is a side view of a further modified embodiment.

FIG. 8 is an end view of the embodiment of FIG. 7.

DESCRIPTION OF THE PREFERRED EMBODIMENT

One preferred embodiment of the invention is shown in FIGS. 1, 3, and 4. FIG. 1 illustrates a conveyor belt cleaner 10 including a transverse support shaft 11 mounted for rotation in side plates, one of which is designated as 12 in FIG. 1, which are mounted on the conveyor housing 13. The shaft 11 extends through a corresponding side plate (not shown) on the other side of the conveyor. Located within the conveyor housing 13 are one or more belt cleaner blades 15 mounted on or carried by the support shaft 11. A variety of cleaner blade mounting arrangements are available for use with the tensioning arrangement of the present invention including those disclosed in U.S. Pat. Nos. 4,249,650 and 4,598,823.

In this embodiment of the invention, the belt cleaner blade 15 is mounted on the shaft 11 for rotation therewith and is rotated into and out of engagement with a conveyor belt 16. Although the embodiment of FIG. 1 illustrates a "doctor blade" type of cleaner blade 15, the present invention is also appropriate for use with cleaner blades of the "arm and blade" type.

The embodiment of FIG. 1 includes a crank element 17 consisting of a circular hub 18 mounted over the shaft 11 and a radially extending arm 20. A plurality of set screws 21A, 21B, and 21C are threaded through the hub 18 and connect the crank 17 to the support shaft 11 for rotation therewith. A plate 22 is connected to the arm 20 at its outer end and forms an extension thereof. A U-shaped bracket 23 is mounted on the conveyor housing 13 with outwardly extending legs 23A and 23B.

An inflatable, expandable bladder 25 is connected to leg 23B of the bracket such that the bladder 25 has a fixed end 26 which is connected to and remains adjacent the leg 23B and a movable end 27 which moves outwardly from the fixed end as the bladder 25 expands. The movable end 27 can be connected to the arm 20 or placed in abutting engagement therewith. The bladder 25 is connected at its fixed end to an inlet check valve 28 of the type normally associated with inner tubes and other pressurizable devices. The check valve 28, when placed in engagement with a hose connected to a source of pressure fluid, opens to admit air, but immediately closes to maintain pressurized air in the bladder when the pressurization process is completed.

A pressure gauge 30 is disposed between the inlet valve 28 and the bladder 25 to provide a visual display of the pressure contained within the bladder. An adjustable stop 31 is mounted on leg 23A of the bracket 23. The stop 31, best illustrated in FIG. 3, can be adjusted to limit the travel of said crank in one direction.

The operation of the embodiment illustrated in FIGS. 1, 3, and 4 is as follows. When the support shaft 11 and the corresponding cleaner blade elements 15 are initially installed in association with the conveyor belt 16, the bladder 25 is in its depressurized position, and the blades 15 are out of contact with the belt 16. After securing the shaft 11 in the side plates 12, the hub 18 is slid over the shaft and the set screws 21A–21C are securely tightened such that the crank 17 is fixed to the shaft 11 for rotation therewith. When the operator wants to initiate cleaning of the belt, a hose or other conduit for fluid pressure is connected to the inlet valve 28.

Pressure is admitted through valve 28 to expand bladder 25. Since the end 26 is affixed to leg 23b of bracket 23, this end remains stationary. As the bladder 25 expands, however, the end 27 moves away from leg 23b and toward leg 23a and stop 31. The arm 20 is moved toward the stop 31 by the bladder thereby rotating the support shaft 11 and causing the scraper blade 15 to engage the conveyor belt 16 for cleaning. Pressurized air is admitted to the bladder 25 until the gauge 30 displays a predetermined pressure value.

Charts are distributed with the pneumatic tensioning arrangement which indicate desirable pressure values for the bladder based on varying belt widths. All the conveyor belt operator need do is to determine the width of the conveyor belt on which the cleaning operation is to be conducted and inflate the bladder according to the value recommended in the chart.

The tensioning device of the present invention provides a constant engaging force throughout the cleaning operation. No wear of seals takes place as in prior art arrangements nor is there a diminuition in value of the cleaning force exerted as blades wear. No leakage of air takes place from the bladder since it is entirely self contained. The bladder 25 acts as an air shock when the cleaner blades contact a mechanical splice in the conveyor belt. The impact of the splice on the blades causes the blades 15 and shaft 11 to rotate away from belt 16 and return automatically after the splice passes.

When it is determined that it is an appropriate time to replace worn belt cleaner blades, the operation is rendered extremely simple by the device of the present arrangement. Worn blades can be replaced without the necessity of stopping the conveyor belt. The operator simply activates the valve 28 so as to release pressure contained in the expanded bladder 25. When this takes place, the end 27 of the bladder moves toward the fixed end 26 and the arm 20 rotates the shaft 11 in a counterclockwise direction as viewed in FIG. 3. Rotation of the support shaft 11 causes the cleaner blades 15 to move out of engagement with the belt 16 for easy repair or replacement. When the worn components have been replaced and it is desired to again begin the belt cleaning operation, the valve 28 is activated and fluid from a pressure source expands the bladder 25 causing it to expand and causing the belt cleaner blades 15 to again engage the conveyor belt 16.

The embodiment shown in FIGS. 2, 5 and 6 is similar in operation to the embodiment of FIGS. 1, 3 and 4, previously described, but varies slightly in structural details. As best shown in FIG. 2, a stub shaft 35 extends outwardly from the side of conveyor housing 36. A sleeve 37 encircles the stub shaft 35 and is relatively rotatable with respect thereto. A collar 38 is secured over the stub shaft 35 at one end thereof by set screws 40a and 40b. The collar serves to hold the sleeve 37 on the stub shaft 35. Extending radially outwardly from the sleeve 37 is an arm 41. The arm 41 is connected at its radially inner end to the sleeve 37 and at its radially outer end to an inflatable expandable bladder 42.

A bracket 43 is shown in FIG. 2 mounted on the side wall of the conveyor belt housing 36. Extending outwardly from the bracket 43 is a channel shaped base member 45. The bladder 42 is mounted at one end on the base 45 and at the other end is connected to the arm 41. An inlet check valve 46 is connected to the bladder 42 and a pressure gauge 47 is connected intermediate the inlet 46 and the bladder 42. A transverse support shaft 48 is shown with one end mounted within a collar 50. The support shaft 48 is secured within the collar 50 by means of set screws 51a and 51b. The collar 50 is connected to arm 41 by any of a number of conventional methods such as, for example, welding. A belt cleaner blade 52 is mounted on the support shaft for engagement with a conveyor belt 53.

The operation of the embodiment of FIGS. 2, 5 and 6 is similar in operation to the device of FIG. 1 in that inflation of the bladder 42 causes the belt cleaner blades 52 to engage the conveyor belt 53. The manner of engagement is, however, slightly different. The transverse shaft 48 does not rotate in the manner of the shaft 11 of FIG. 1. Rather the shaft 48 is moved through an arcuate path until engagement occurs.

When the operator wants to initiate belt cleaning, a pressure hose is affixed to the check valve 46. Pressurized air is transmitted to the bladder 42 causing it to expand. Expansion of the bladder 42 forces the arm 41 to rotate in a clockwise direction as viewed in FIG. 5 about stub shaft 35 forcing the support shaft 48 to travel in an arcuate path about the center of the stub shaft 35 until the blades 52 contact the belt 53. When the pressure gauge 47 indicates that the bladder has been inflated to the recommended value the pressure source is disconnected. At this point, the cleaner blade 52 engages the conveyor belt 53 with the desired force. The same advantages of utilization of a self contained bladder for pneumatic activation of a tensioning mechanism is present in both embodiments of FIG. 2 and FIG. 1.

A further embodiment of the present invention is illustrated in FIGS. 7 and 8. This embodiment is particularly adapted for retrofit of existing mechanical tensioners. A side plate 60 is adapted for fastening to the side of a conveyor housing wall. Extending from the plate 60 is a hollow circular sleeve 61 through which passes a transverse support shaft 62. An offset arm 63 is fixed to the sleeve 61 and extends downwardly therefrom. A collar 65 slides over the shaft 62 until it abuts sleeve 61. The collar 65 is then secured to the shaft 62 by set screws 66a, 66b and 66c. Extending downwardly from the collar 65 is an offset arm 67. An inflatable bladder 68 is shown disposed between and connected to arms 63 and 67. A pressure gauge 70 and a check valve 71 are connected in fluid communication with the bladder 68.

The operation of the embodiment of FIGS. 7 and 8 is similar to the operation of the embodiment of FIG. 1. When it is desired to retrofit the pneumatic tensioning device of the present invention in place of mechanical prior art arrangements, the embodiment of FIGS. 7 and 8 may be easily installed. The existing tensioning arrangement is removed including the existing side plate. Side plate 60 is installed such that the support shaft 62 extends through the enter of sleeve 61. Side plate 60 is then bolted to the side of the conveyor housing. Collar 65 is inserted over shaft 62 and the set screws 66a–c tightened. Inflatable bladder 68, in its depressurized condition, is then positioned between the arms 63 and 67 and bolted or otherwise affixed thereto. Check valve 71 and pressure gauge 70 are then connected to bladder 68.

When the operator wants to clean the belt, a pressure hose is connected to check valve 71 and the bladder 68 is inflated to the pressure which is recommended in corresponding charts. Arm 63 is connected to sleeve 61 which is fixed to side plate 60 thereby rendering arm 63 fixed in the position shown in FIG. 7. Inflation of the bladder 68 causes the arm 67 to act as a crank element and to move in an arc away from arm 63 and to rotate the shaft 62 in a counterclockwise direction as viewed in FIG. 7. It is assumed, for purposes of this embodiment, that cleaner blades are mounted on shaft 62 in a manner such that counterclockwise rotation of shaft 62 causes the cleaner blades to engage the belt and clockwise rotation causes disengagement.

The pneumatic tensioning arrangement of the present invention provides a constant tensioning force throughout the life of the cleaning blades regardless of blade wear. It allows a conveyor operator to accurately and consistently tension the system by simply inflating the bladder until a predetermined value is displayed on the pressure gauge. Unlike prior art arrangements, no external air supply is required after belt cleaning is initiated. The need for pressure regulators is eliminated. The inflatable bladder automatically provides for torque relief when mechanical conveyor belt splices periodically pass by the cleaner blades. In that regard, the bladder acts as a torque storage unit. The tensioning arrangement can be located at any convenient position at an arc of 360° around the main frame and can be placed on either side of the conveyor belt housing.

Various features of the invention have been particularly shown and described in connection with the illustrated embodiments of the invention. However, it must be understood that these particular arrangements merely illustrate and that the invention is to be given its fullest interpretation within the terms of the appended claims.

What is claimed is:

1. A pneumatically actuated tensioning arrangement for a conveyor belt cleaner with a support shaft mounted transverse to the direction of conveyor belt travel and one or more belt cleaner blades supported by said shaft movable into or out of engagement with said belt to be cleaned, said tensioning arrangement including a stub shaft mounted parallel to said support shaft, a crank element mounted on said stub shaft for relative rotation thereabout, a collar mounted on said crank said collar adapted to carry said support shaft an inflatable, expandable bladder having at least one end which is movable with respect to said crank element for movement thereof, and an inlet valve connected to said inflatable bladder to control inflation and deflation thereof whereby upon pressurization of said bladder by a pressure source, said bladder is caused to expand such that said movable end of said bladder engages said crank element and applies force thereto sufficient to cause rotation of said crank thereby moving said support shaft through an arcuate path about said stub shaft and causing said belt cleaner blades to engage said belt and, whereby, upon depressurization of said bladder, said belt cleaner blades disengage from said conveyor belt.

2. A pneumatically actuated tensioning arrangement as in claim 1 including a pressure gauge connected to said bladder in fluid communication therewith, said pressure gauge operative to display the pressure in said bladder.

3. A pneumatically actuated tensioning arrangement as in claim 1 including a stationary mounting bracket connected to and supporting said bladder.

4. A pneumatically actuated tensioning arrangement as in claim 3 including an adjustable stop carried by said bracket positioned adjacent said crank whereby the position of said stop may be varied to limit the travel of said crank in one direction.

5. A pneumatically actuated tensioning arrangement as in claim 1 in which said crank is connected to said bladder for movement therewith.

* * * * *